March 11, 1930. B. C. SILVER 1,750,435
CHILD'S SEAT
Filed Oct. 27, 1928
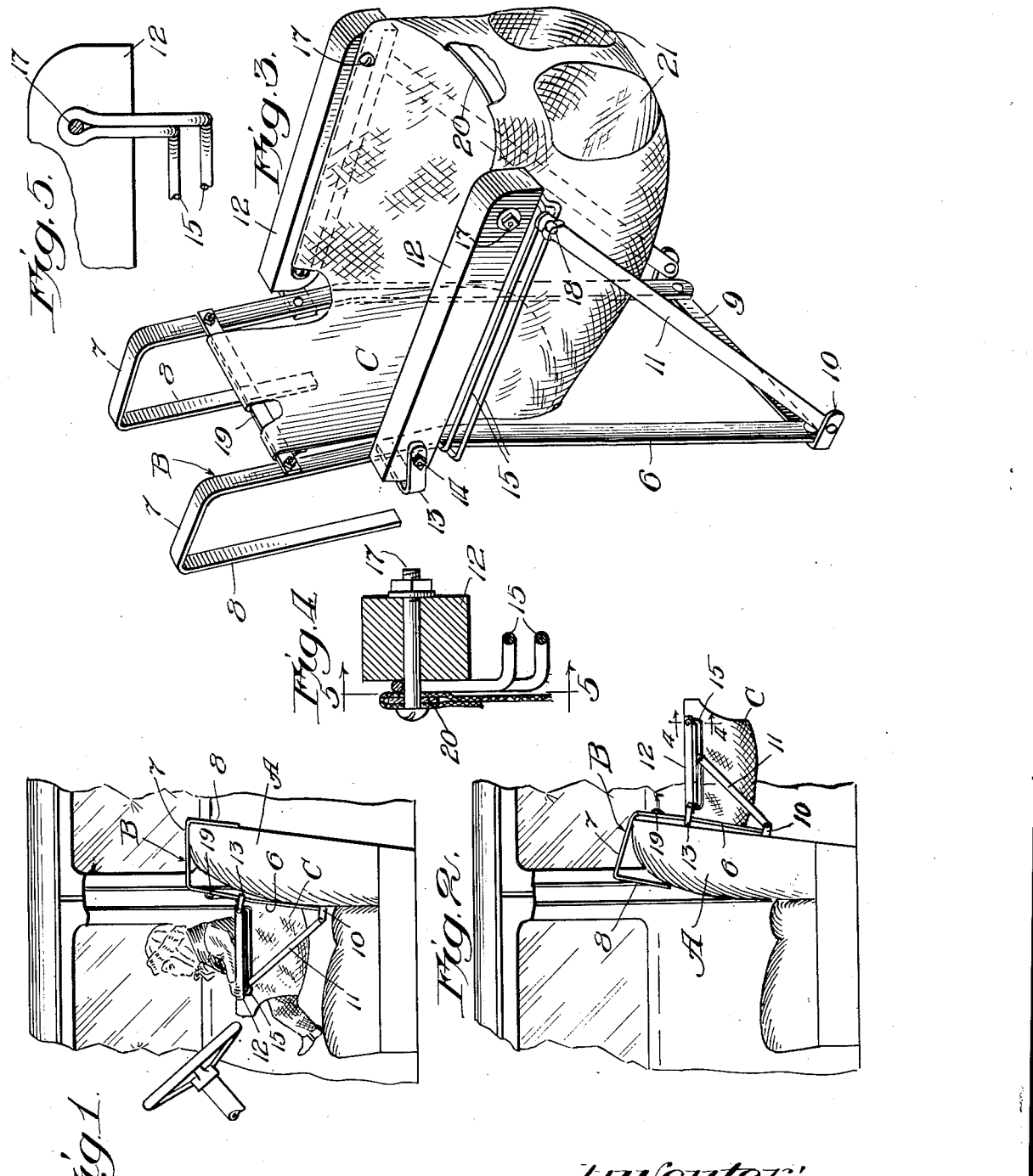
Inventor:
B. Coleman Silver
by Clunning & Clunning
Attys Patented Mar. 11, 1930

1,750,435

UNITED STATES PATENT OFFICE

B COLEMAN SILVER, OF CHICAGO, ILLINOIS

CHILD'S SEAT

Application filed October 27, 1928. Serial No. 315,549.

This invention relates to a child's seat such as is particularly adapted for use in automobiles. It is a primary object of this invention to design such a seat which may be suspended over the back of an automobile seat, and facing either forwardly therein or rearwardly thereof, and for this purpose to provide a structure which is simple, inexpensive, light, and adjustable so as to meet the various conditions imposed by the use to which the seat is put.

A suggestive embodiment of this invention is set forth in the accompanying drawing in the manner following:

Figure 1 is a side elevation of an automobile front seat which furnishes a mounting for the child's seat here shown as facing forwardly;

Fig. 2 which is a similar view shows the child's seat as facing rearwardly;

Fig. 3 is a view in perspective of the child's seat per se;

Fig. 4 is an enlarged detail in section on line 4 of Fig. 2; and

Fig. 5 is an enlarged detail in section on line 5—5 of Fig. 4.

In Figs. 1 and 2 is shown an automobile front seat having a cushioned back A over which is hooked the frame B of the present child's seat. This frame is desirably produced from a pair of like metal bars each having a vertical section 6 and a top horizontal section 7 with a downturned extremity 8. The upper end of each frame bar is accordingly in the general form of a hook which adapts the seat structure to be suspended from the top of the automobile seat back A, the frame being disposed either way— i. e., upon the front or rear side of the seat back. Inasmuch as such a seat back is inclined somewhat from the vertical, it follows that the structure which is carried by the frame bars will have different inclinations upon the front and rear sides of the seat back, so that provision should desirably be made for adjustments sufficient to compensate for such variations. This feature of my invention will presently be explained.

The two frame bars are extended in parallel and spaced relation, being connected adjacent their lower ends by a cross bar 9 the ends of which are laterally turned to provide ears 10 to which are pivotally joined oblique braces 11 extending forwardly and upwardly to support at their upper ends the outer ends of a pair of arm rests 12, these latter parts being desirably made of wood. The rear ends of the arm rests are pivotally supported by angle brackets 13 which have a fixed mounting on the frame bars, as shown. The pivot connection at the rear of each arm rest may take the form of a bolt 14 which supports also the looped upwardly turned ends of a pair of guide rods 15 spaced slightly to provide a support through which is extended a bolt which is joined to the upper end of one of the oblique braces 11. These guide rods which may consist of a single wire are disposed parallel to the arm rests, preferably just therebelow, and their forward ends are upturned and looped to derive support from bolts 17 which traverse the arm rests adjacent their forward ends. The bolts which provide for the oblique braces connections adapted to slide the length of the guide rods 15 are equipped with thumb or wing nuts 18 by which the angular position of the braces, and of the arm rests as well, may be fixed.

Extending between the two frame bars slightly above the rear ends of the arm rests is a second cross bar 19 over which may be fastened one end of a flexible sheet material C forming the body of the child's seat. This sheet extends down below the arm rests and then up again to connect with a bow 20 which preferably is disposed along the inner sides of the rests and across the front of the seat structure. The bow itself may be supported in place at opposite ends of the arm rests by the same bolts 14 and 17 which support the guide bars 15. In the front of the seat I provide a pair of openings 21 through which may extend the legs of the child who occupies the seat. The size and proportions of the seat structure may optionally be varied, and by extending one dimension sufficiently the device may serve admirably as a crib.

From the foregoing description it will be manifest that the present seat may be produced from inexpensive materials which will produce a light structure and one which is strong as well. Of major importance is the arrangement of the seat parts by which the same are adjustable to present the arm rests and seat body depending therebelow at a desired angle. Such adjustments may be made with a minimum of effort and time, and adapt the seat admirably for suspension either forwardly or rearwardly of the back of an automobile seat, as suggested in Figs. 1 and 2, respectively.

It is conceivable, of course, that the invention may be variously modified, but in so far as any such changes conform to the requirements of the appended claims, I would include the same within the scope of this invention.

I claim:

1. In a child's seat, the combination of a pair of spaced vertical frame bars the upper ends of which are formed into hooks, arm rests pivoted to the fame bars, braces connected pivotally to the frame bars and slidingly to the rests, a bow having its end disposed adjacent the frame bars extended parallel to the arm rests and across therebetween, means connecting the bow to each rest whereby the former derives support from the latter, and a flexible sheet supported at its edges by the bow and forming a seat in which a child may be supported.

2. In a child's seat, the combination with a pair of vertical frame bars of arm rests pivotally supported thereon, a pair of guideways each comprising a double rod having looped ends, a bow having its ends adjacent the frame bars and extended along the arm rests and across therebetween, means connecting the bow and guideways to the rests, and a brace pivoted to each frame bar and slidingly connected to one guideway.

3. In a child's seat, the combination with a pair of spaced frame bars having hooks at their upper ends adapted for suspensive attachment to a fixed object, of an adjustable seat structure mounted to extend laterally from the frame bars, said structure comprising arm rests, one pivoted to each frame bar, braces extending between the rests and frame bars and connected adjustably and slidably with one and pivotally with the other, and a seat of flexible sheet material suspended between the frame bars and rests, whereby the arm rest braces are free for adjustment relative to the frame bars to support the seat in a horizontal plane irrespective of the inclination of the frame bars.

4. In a child's seat, the combination with a back support, of arm rests pivoted at one end thereto, braces extended between the support and arm rests and connected pivotally with one and adjustably and slidably with the other, a bow extended between the free ends of the arm rests and parallel to the same, means joining the bow to the arm rests, and a seat of flexible sheet material suspended from the back support and from the bow throughout the major portion of its length.

5. In a child's seat, the combination with a back support, of arm rests pivoted at one end thereto, braces extending between the support and arm rests and connected pivotally to the former, a guideway associated with each rest, means connecting the braces adjustably to the guideways, a bow having its ends adjacent the back support and extended along the arm rests and across therebetween, means interconnecting the bow, arm rests, and guideways, and a seat of flexible sheet material suspended from the bow.

6. In a child's seat, the combination with a back support of a bow having its two ends arranged adjacent the support, a seat of flexible sheet material suspended from the bow, arm rests joined to opposite sides of the bow and pivotally connected to the support, and braces extended between the support and arm rests and connected pivotally to one and adjustably and slidably to the other, whereby the arm rest braces are free for adjustment relative to the back support to maintain the seat in a horizontal plane irrespective of the inclination of the back support.

7. In a child's seat, the combination with a back support of a bow having its two ends disposed adjacent the support, a seat of flexible sheet material suspended from the bow, arm rests joined to opposite sides of the bow and pivotally connected to the support, and braces extended between the support and arm rests having a pivotal connection with the former and an adjustable and slidable connection with the latter, whereby the arm rest braces are free for adjustment relative to the back support to maintain the seat in a horizontal plane irrespective of the inclination of the back support.

In testimony whereof, I have hereunto set my hand this 24th day of October, 1928.

B COLEMAN SILVER.